United States Patent
Halcom

(10) Patent No.: US 12,060,910 B2
(45) Date of Patent: Aug. 13, 2024

(54) ADJUSTABLE CRANK ARM

(71) Applicant: Bell Textron Inc., Fort Worth, TX (US)

(72) Inventor: Lancer Drake Halcom, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 186 days.

(21) Appl. No.: 17/525,933

(22) Filed: Nov. 14, 2021

(65) Prior Publication Data
US 2023/0151845 A1    May 18, 2023

(51) Int. Cl.
| | |
|---|---|
| *F16C 7/06* | (2006.01) |
| *B64C 27/37* | (2006.01) |
| *B64C 29/00* | (2006.01) |

(52) U.S. Cl.
CPC ............... *F16C 7/06* (2013.01); *B64C 27/37* (2013.01); *B64C 29/0033* (2013.01); *F16C 2326/43* (2013.01)

(58) Field of Classification Search
CPC ....................................................... B64C 27/37
See application file for complete search history.

(56) References Cited

U.S. PATENT DOCUMENTS

| | | | |
|---|---|---|---|
| 6,953,313 B2 * | 10/2005 | Tylosky | F16B 7/06 403/322.2 |
| 7,524,169 B2 * | 4/2009 | Podgurski | B64C 27/605 416/168 R |

* cited by examiner

*Primary Examiner* — Justin D Seabe
*Assistant Examiner* — John S Hunter, Jr.
(74) *Attorney, Agent, or Firm* — Lightfoot & Alford PLLC

(57) ABSTRACT

An adjustable length crank arm includes a first component having a longitudinal length, a second component coupled to the first component, the second component having a longitudinal length. A total length of the crank arm can be adjusted by changing an amount of longitudinal overlap that exists between the first component and the second component. The adjustable length crank arm can include a first wedge and a second wedge and at least a portion of each of the first wedge and the second wedge is longitudinally captured between the first component and the second component.

18 Claims, 10 Drawing Sheets

ADJUSTABLE CRANK ARM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Crank arms are a critical component in many mechanical systems, including systems for folding aircraft blades. In some cases, crank arms can be installed as a final or near final component in a folding mechanism, and such mechanisms can require some degree of rigging or otherwise may need to be provided a specialized length to meet the needs of connecting components of the folding mechanism. Accordingly, conventional crank arms are often customized at the point of installation to bridge a previously inexactly known connection distance and this matching process can involve match drilling a plurality of components to provide a crank arm with the precise length needed for a particular installation. However, utilizing match drilling and other methods of generating crank arms with the needed overall lengths is typically a single use scenario in which the drilled components are good for a single installation and not used thereafter. Accordingly, there remains a need for crank arms that are easily adjustable in overall length and that can be reused and/or adjusted after a successful initial installation.

BRIEF DESCRIPTION OF THE DRAWINGS

Prior Art

Prior Art

Prior Art

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
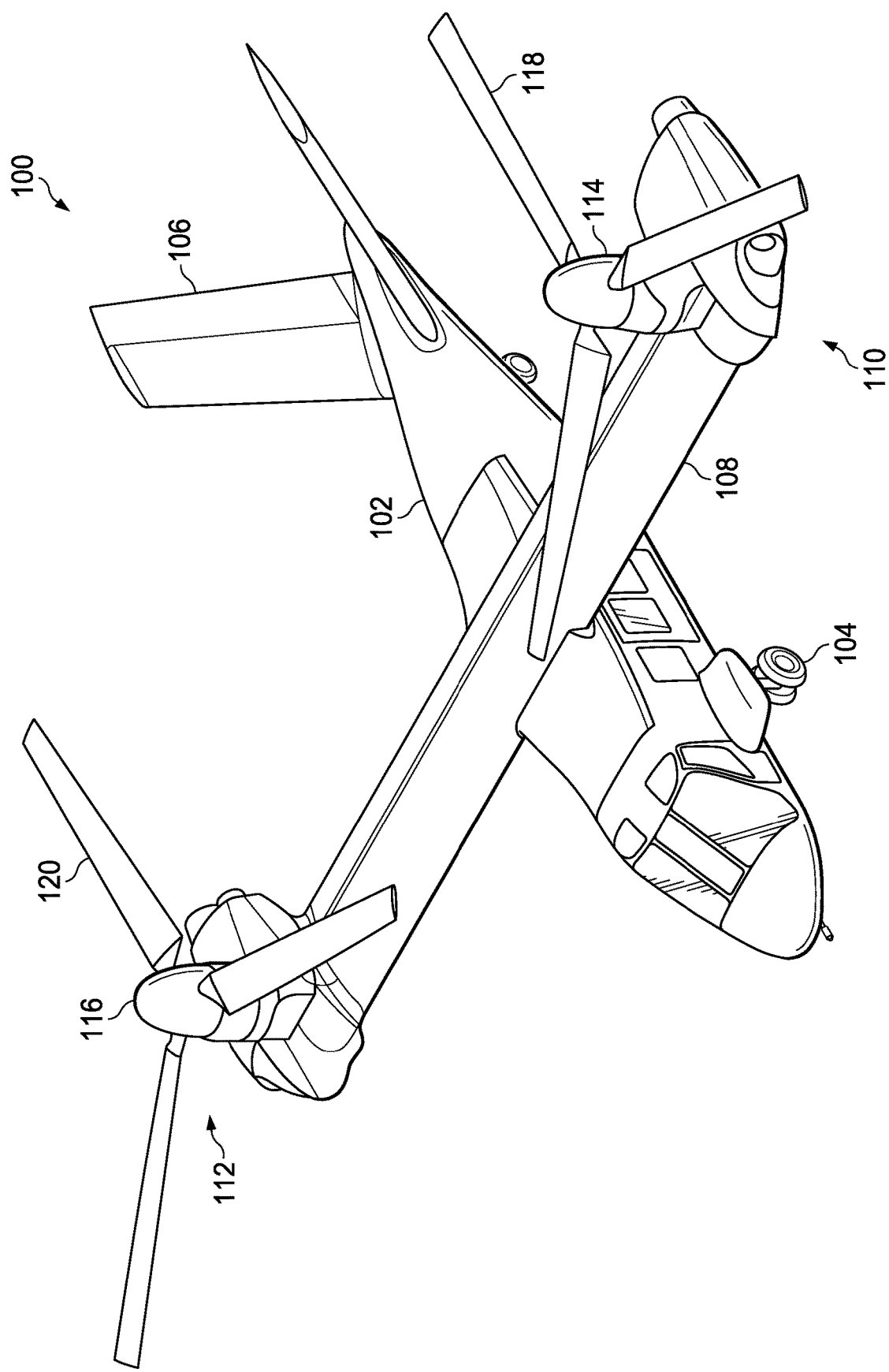
FIG. 1 is an oblique view of a tiltrotor aircraft configured in a helicopter mode and comprising an embodiment of an adjustable crank arm according to this disclosure.
Figure 2:
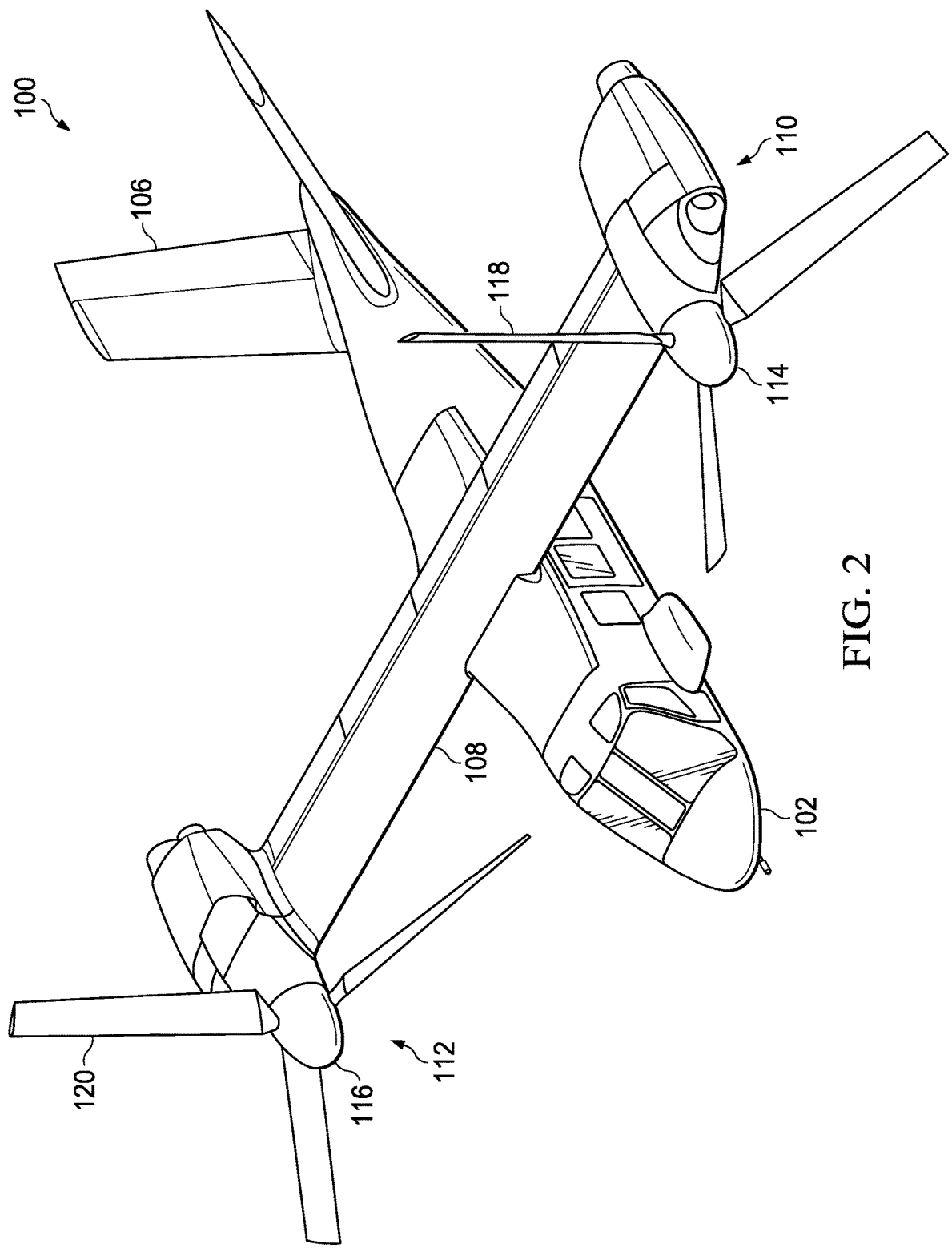
FIG. 2 is an oblique view of the aircraft of FIG. 1 configured in an airplane mode.

FIGS. 1 and 2 illustrate a tiltrotor aircraft 100, which can include a fuselage 102, landing gear 104, tail member 106, wing 108, propulsion system 110, and propulsion system 112. Each propulsion system 110, 112 includes a fixed engine and rotatable proprotor 114, 116, respectively. Each rotatable proprotor 114, 116 has a plurality of foldable rotor blades 118 and 120, respectively. The position of proprotors 114, 116, as well as the pitch of blades 118, 120, can be selectively controlled in order to selectively control direction, thrust, and lift of tiltrotor aircraft 100. FIG. 1 shows tiltrotor aircraft 100 in a helicopter mode, and FIG. 2 shows tiltrotor aircraft 100 in an airplane mode.

Figure 3:
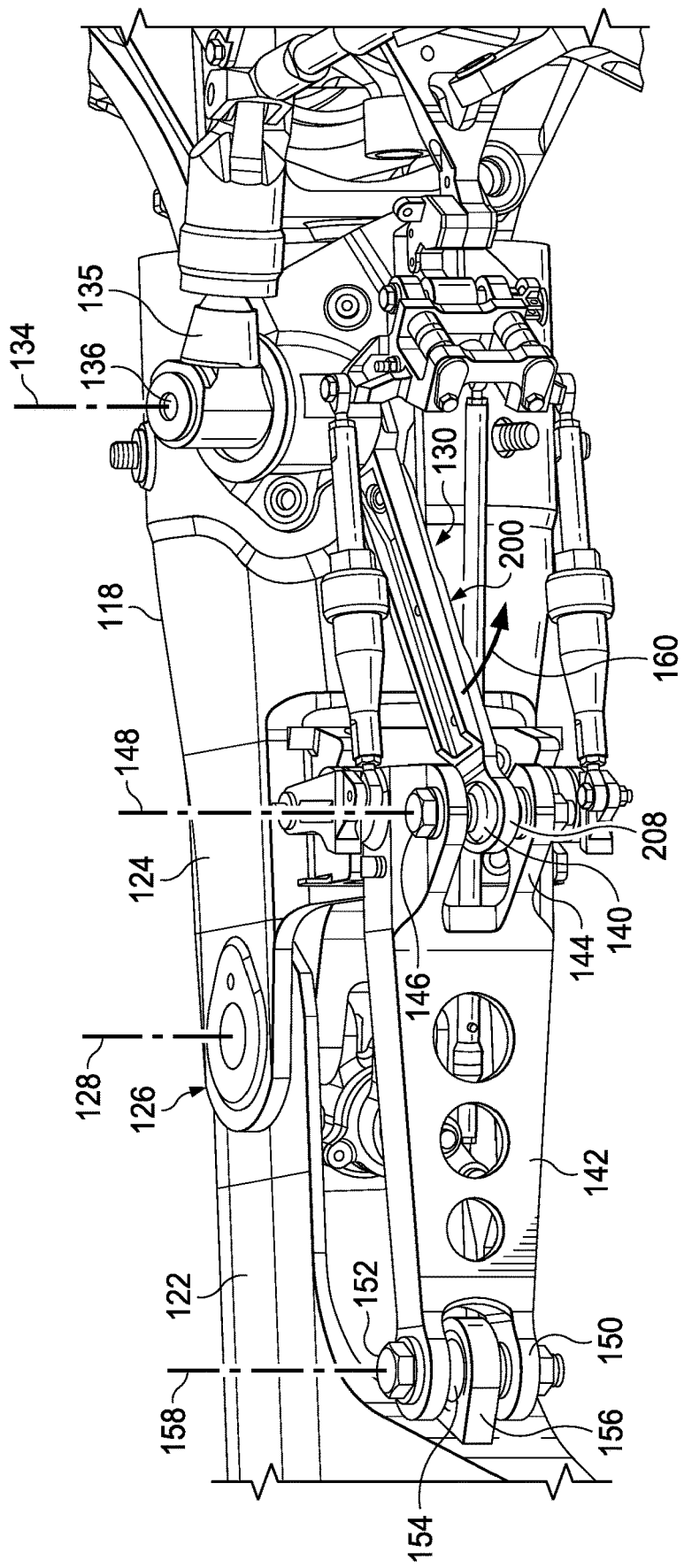
FIG. 3 is an oblique view of a portion of a rotor of the aircraft of FIG. 1 and showing a folding mechanism configured in an extended position, the folding mechanism comprising a prior art crank arm.
Figure 4:
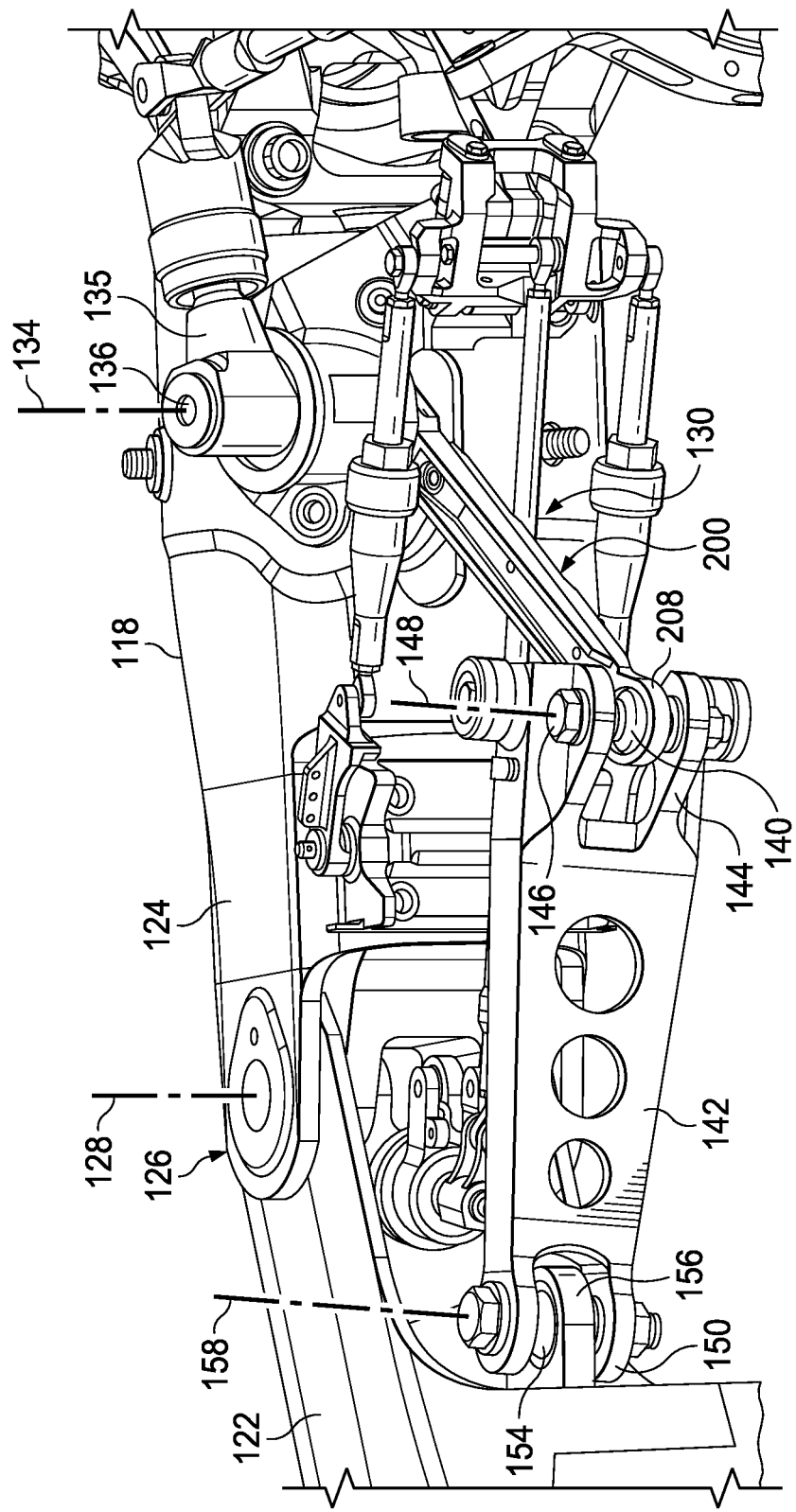
FIG. 4 is an oblique view of the portion of the rotor of FIG. 3 and configured in a partially folded position.

Referring to Prior Art FIGS. 3 and 4, to allow for at least some of blades 118, 120 to fold, an outboard blade portion 122 is coupled to an inboard portion 124 at hinge 126, allowing outboard portion 122 to pivot relative to inboard portion 124 via hinge 126 and about pivot axis 128.

A crank arm assembly 130 comprises a prior art crank arm 200 selectively pivotable about a crank axis 134 by operation of a trunnion 135, trunnion 135 being coupled to an inner end of crank arm 200 with shaft 136. Crank arm 200 has a bearing pocket 208 located at an outer end of crank arm 200 opposite shaft 136, pocket 208 being configured for receiving a spherical bearing 140. An interstitial link 142 couples crank arm 200 to outboard portion 122 of blade 118, allowing rotation of trunnion 135 about axis 134 to cause rotation of outboard portion 122 about pivot axis 128.

Interstitial link 142 has a crank clevis 144 at an inboard end and configured to be fastened to bearing 140 with fastener 146, allowing for crank arm 200 and link 142 to pivot relative to each other about pivot axis 148. A blade clevis 150 is located on the outboard end of link 142 and configured to be fastened with fastener 152 to a spherical bearing 154, which is carried in pillow block 156 of outboard blade portion 122. This allows for link 142 and outboard portion 122 to pivot relative to each other about pivot axis 158.

To move outboard blade portion 122 between the fully extended position shown in Prior Art FIG. 3 and a folded position, trunnion 135 and crank arm 200 are rotated together about crank axis 134. From the fully extended position, crank arm 200 is rotated in the direction shown by arrow 160, and Prior Art FIG. 4 shows components moved to a partially folded configuration. As crank arm 200 is rotated, interstitial link 142 transfers force from spherical bearing 140 in pocket 208 of crank arm 200 to outboard portion 122 through the spherical bearing 154 in pocket 156. Moving outboard portion 122 toward the fully extended position is accomplished by rotating trunnion 135 and crank arm 200 together in the opposite direction.

Figure 5:
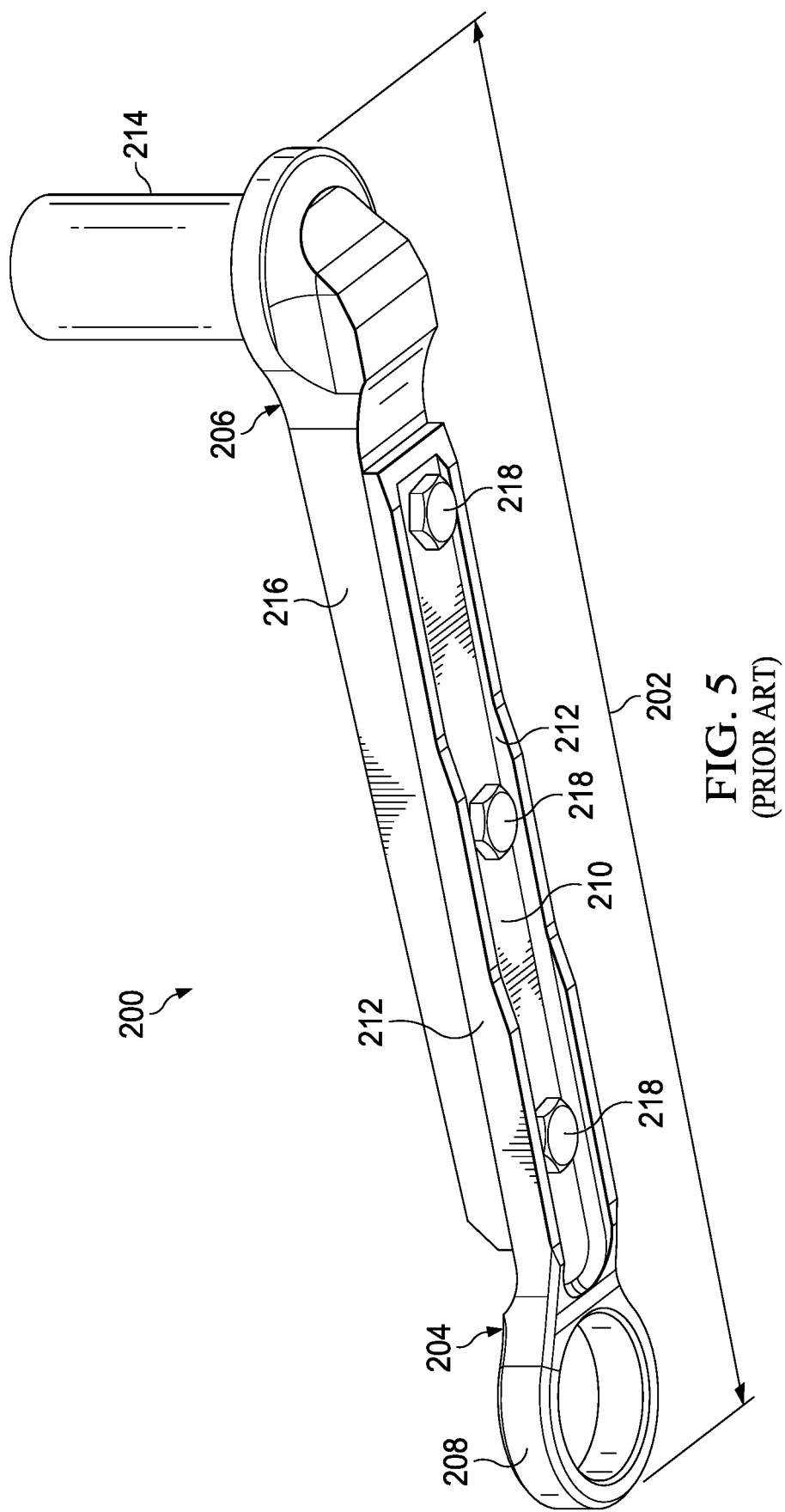
FIG. 5 is an oblique rear view of a prior art crank arm.

Referring now to Prior Art FIG. 5, prior art crank arm 200 generally comprises an overall length 202 that is determined by an amount of longitudinal overlap between a rod end 204 and a receiver arm 206. Rod end 204 comprises the bearing pocket 208 formed substantially as a ringlike structure configured to receive a bearing, such as, but not limited to, a spherical bearing. Rod end 204 further comprises a mounting plate 210 extending from the bearing pocket 208. Mounting plate 210 carries opposing sidewalls 212 that further stiffen mounting plate 210. Receiver arm 206 comprises a cylindrical head 214 connected to a receiver bar 216. In this embodiment, mounting plate 210 and receiving bar 216 are configured to have profiles that face each other and that are complementary to each other, such as, but not limited to, facing flat surfaces. Crank arm 200 is assembled through a match drilling process in which a desired overall length 202 is selected by moving the above-described complementary profiles into contact with each other, holding rod end 204 stationary relative to receiver arm 206, drilling multiple through holes through mounting plate 210 and adjacent receiving bar 216, and finally securing rod end 204 relative to receiver arm 206 using fasteners disposed within the through holes. In this embodiment, threaded bolts 218 are passed through the through holes and secured in place using threaded nuts. While this process of fixing an overall length 202 of crank arm 200 is effective, it is not amenable to adjustments after initially fitting or rigging to a particular installation. Instead, while the components may be reused by drilling more holes and using a new set of holes to provide a different overall length 202, the revision process is time consuming, generates undesirable debris, and can result in undesirable reductions in strength due to the extraneous holes remaining in the mounting plate 210 and the receiving bar 216.

There is a need for crank arms that are structurally sound and adjustable in overall length without generating the undesirable debris and without potentially introducing a weakness into the connective components. Accordingly, at least two embodiments of adjustable length crank arms are disclosed herein. They are both minutely and/or infinitely adjustable in overall lengths so that changes or slight adjustments to the overall lengths can be easily made. Both embodiments allow the crank arm overall lengths to be quickly lengthened or shortened while still being able to react both longitudinal and axial forces as well as bending across the crank arms as a whole, upon final assembly. As will be explained below, pairing of a threaded rod end and a sandwiched jam nut with a set of wedge pieces and a cross-linked bolt (or other fastener) enable the positioning of the two ends of crank arm 300 to be easily brought together or moved away from each other. The embodiments incorporate a turnbuckle approach to linear adjustment through the use of a threaded rod end shank and jam nut which are restrained by structural members (such as wall features and holes).

Figure 6:
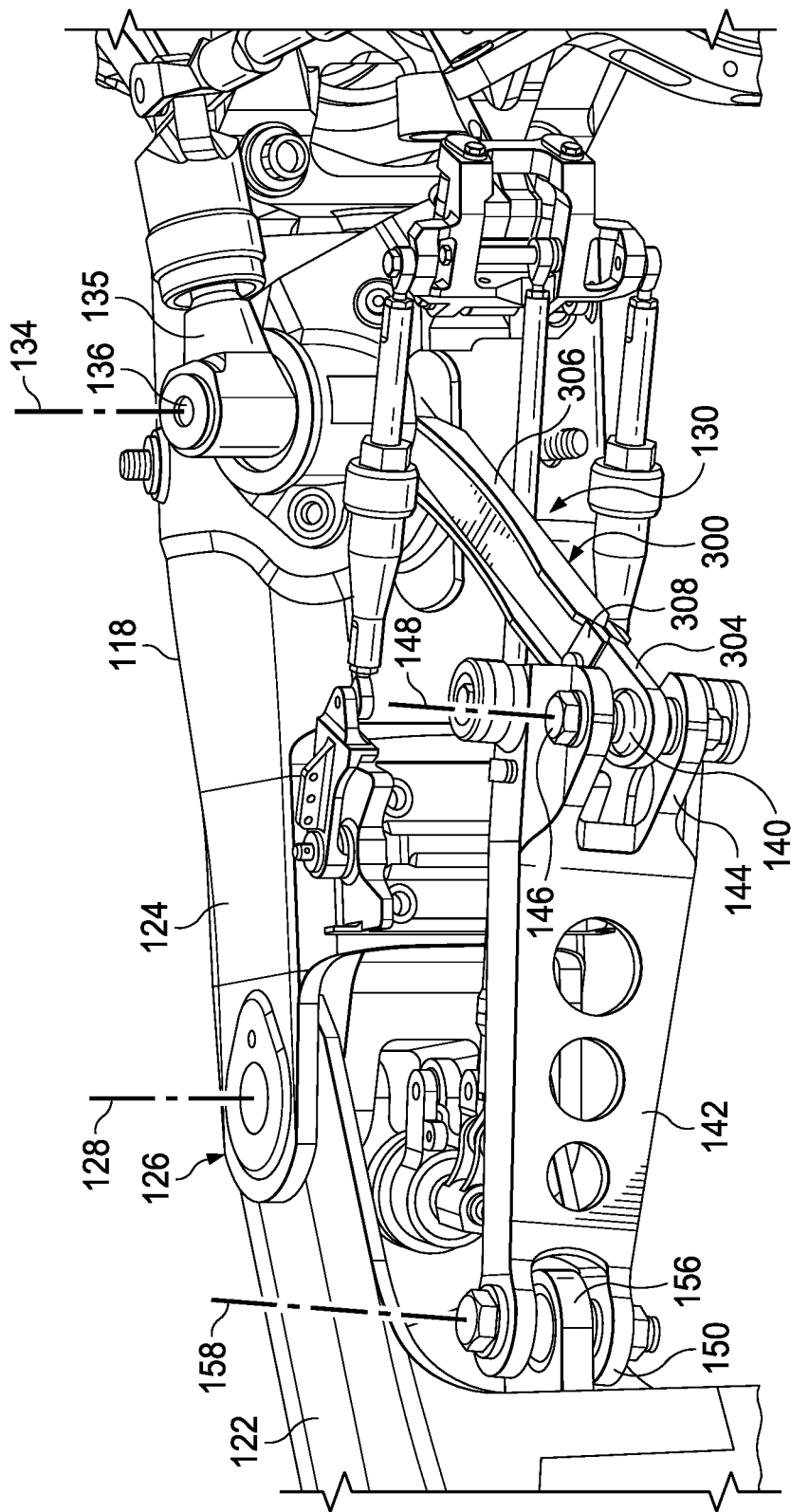
FIG. 6 is an oblique view of a portion of a rotor of the aircraft of FIG. 1 and showing a folding mechanism configured in a partially folded position, the folding mechanism comprising an adjustable crank arm according to an embodiment of this disclosure.
Figure 7:
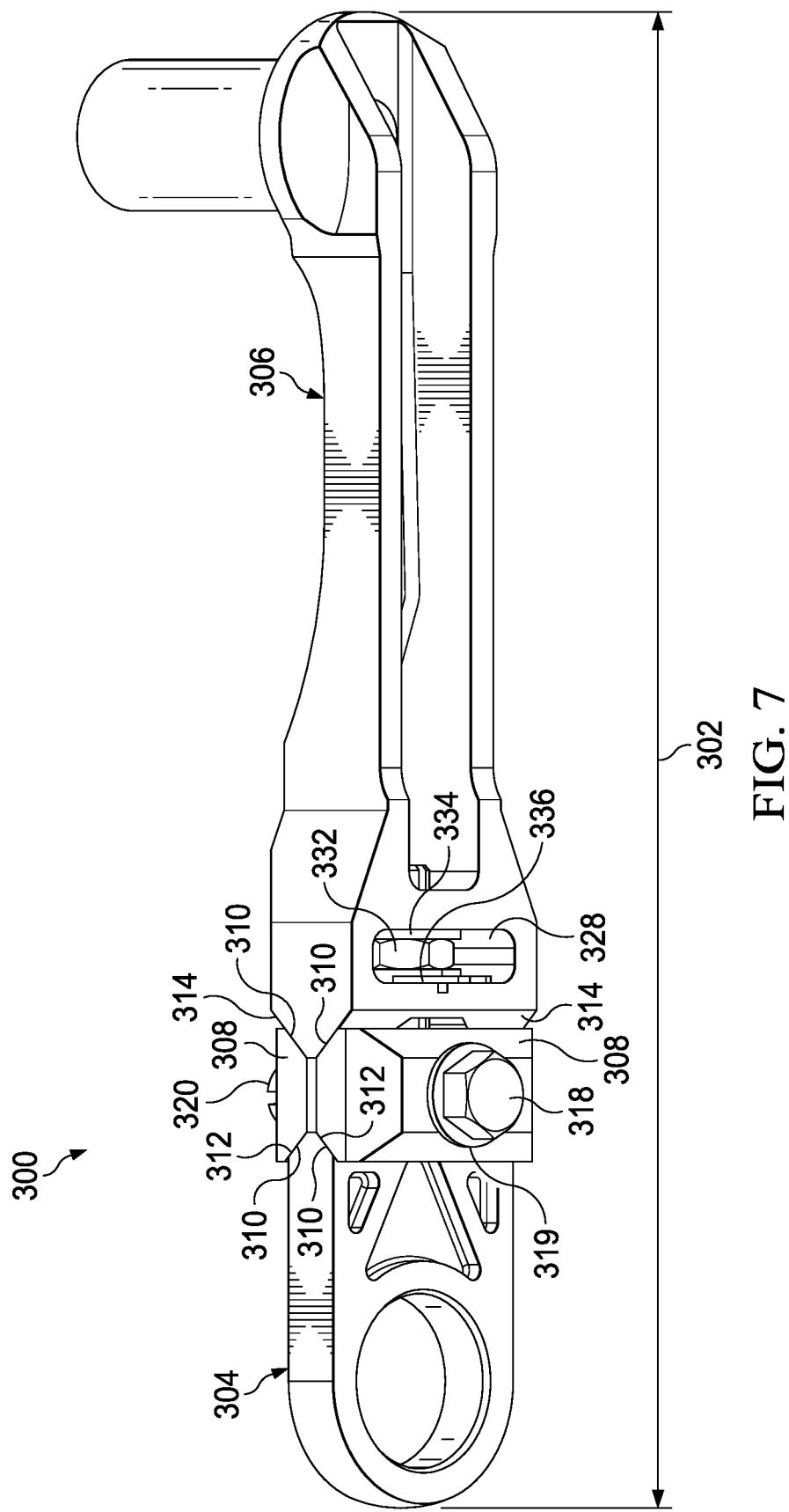
FIG. 7 is an oblique view of the adjustable crank arm of FIG. 6.
Figure 8:
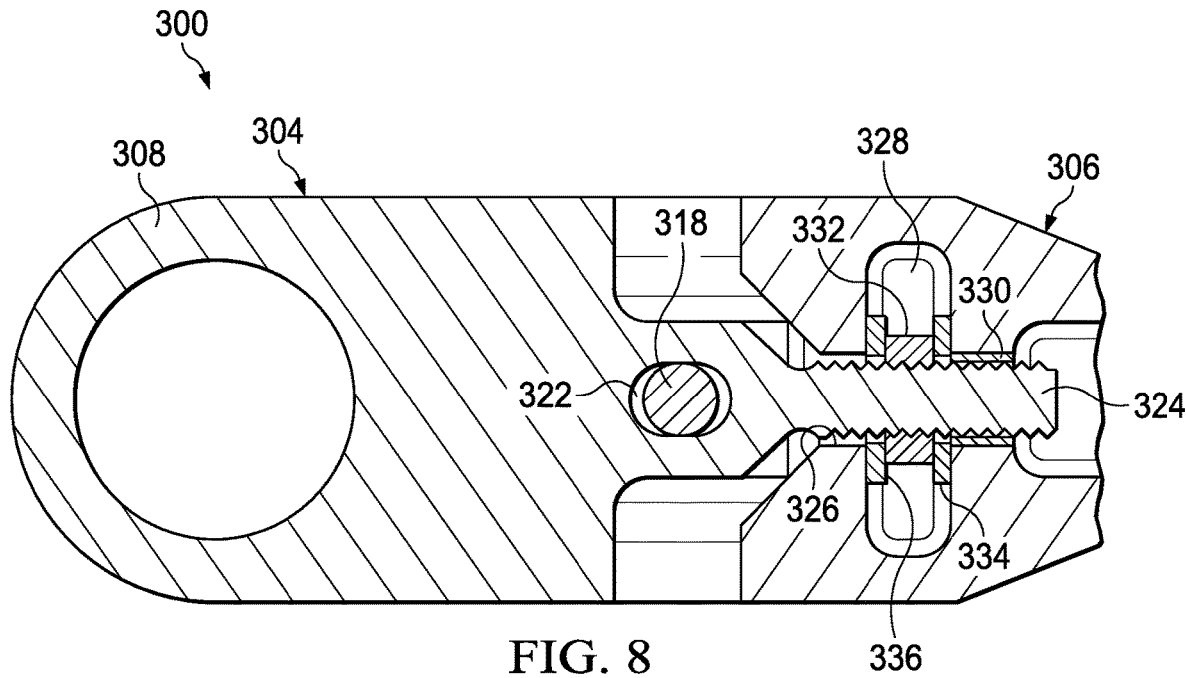
FIG. 8 is a partial cross-sectional view of the adjustable crank arm of FIG. 6.
Figure 9:
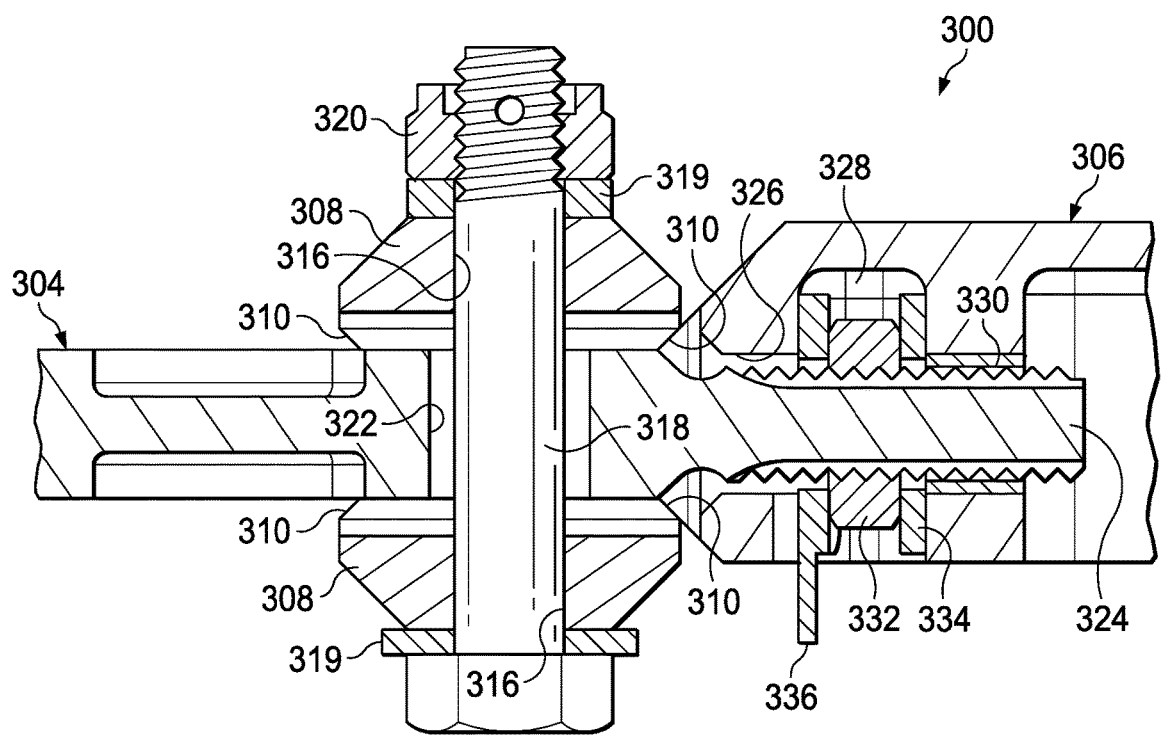
FIG. 9 is another partial cross-sectional view of the adjustable crank arm of FIG. 6.

Referring now to FIG. 6-9, an adjustable crank arm 300 according to an embodiment of this disclosure is shown. FIG. 6 shows adjustable crank arm 300 utilized in crank arm assembly 130, which is a portion of tiltrotor aircraft 100. FIGS. 7-9 show adjustable crank arm 300 in isolation. Adjustable crank arm 300 comprises a rod end 304 and a receiver arm 306. The receiver arm 306 is configured to selectively receive a portion of the rod end 304 while additional components are utilized to secure the rod end 304 relative to the receiver arm 306. Most generally, the adjustable crank arm 300 can be configured to have a variety of different overall lengths 302 by adjusting an amount of longitudinal overlap between the rod end 304 and the receiver arm 306.

Adjustable crank arm 300 further comprises wedges 308 each comprising wedge ramp surfaces 310. Wedge ramp surfaces 310 are configured to complement rod end ramp surfaces 312 of rod end 304 and receiver arm ramp surfaces 314 of receiver arm 306. Wedges 308 further comprise holes 316 configured to receive a threaded bolt 318 (or other fastener) therethrough. Washers 319 can optionally be utilized. Accordingly, in response to a threaded nut 320 being advanced along bolt 318, wedges 308 can be driven toward each other and the resultant interaction between wedge ramp surfaces 310 and each of rod end ramp surfaces 312 and receiver arm ramp surfaces 314 can result in increasing a separation force and/or separation distance between rod end 304 and receiver arm 306. It will be appreciated that in alternative embodiments, instead of or in addition to using nuts 320 for adjusting the location of wedges 308, holes 316 can be threaded and used together with bolts 318 to move wedges 308 relative to each other. Further, it will be appreciated that while wedges 308 comprise substantially flat ramp surfaces 310, in alternative embodiments, wedges can comprise differently shaped surfaces, such as, but not limited to, semi-cylindrical profiles and/or a plurality of suitable surfaces.

Referring to FIG. 8, it can be seen that bolt 318 passes through a slot 322 formed in rod end 304 so that some amount of longitudinal adjustment between rod end 304 and receiver arm 306 can be made without applying a bending force to bolt 318 from rod end 304. Adjustable crank arm 300 further comprises a threaded shank 324 extending from rod end 304 for being received by receiver arm 306. Receiver arm 306 comprises an internal passage 326 configured to receive threaded shank 324. Further, a pocket 328 is formed in receiver arm 306 and intersects internal passage 326. In this embodiment, a cylindrical insert 330 is secured within internal passage 326 and is configured to accept threaded shank 324. Further, a jam nut 332 is disposed within pocket 328 and sandwiched between a shim washer 334 and a jam nut lock washer 336. Accordingly, a wrench or other tool can be utilized by inserting the tool into pocket 328 to interface jam nut 332. With sufficient advancement of jam nut 332 along threaded shank 324, longitudinal adjustment and tension can be applied to threaded shank 324, thereby increasing a bending stiffness of the adjustable crank arm 300.

Figure 10:
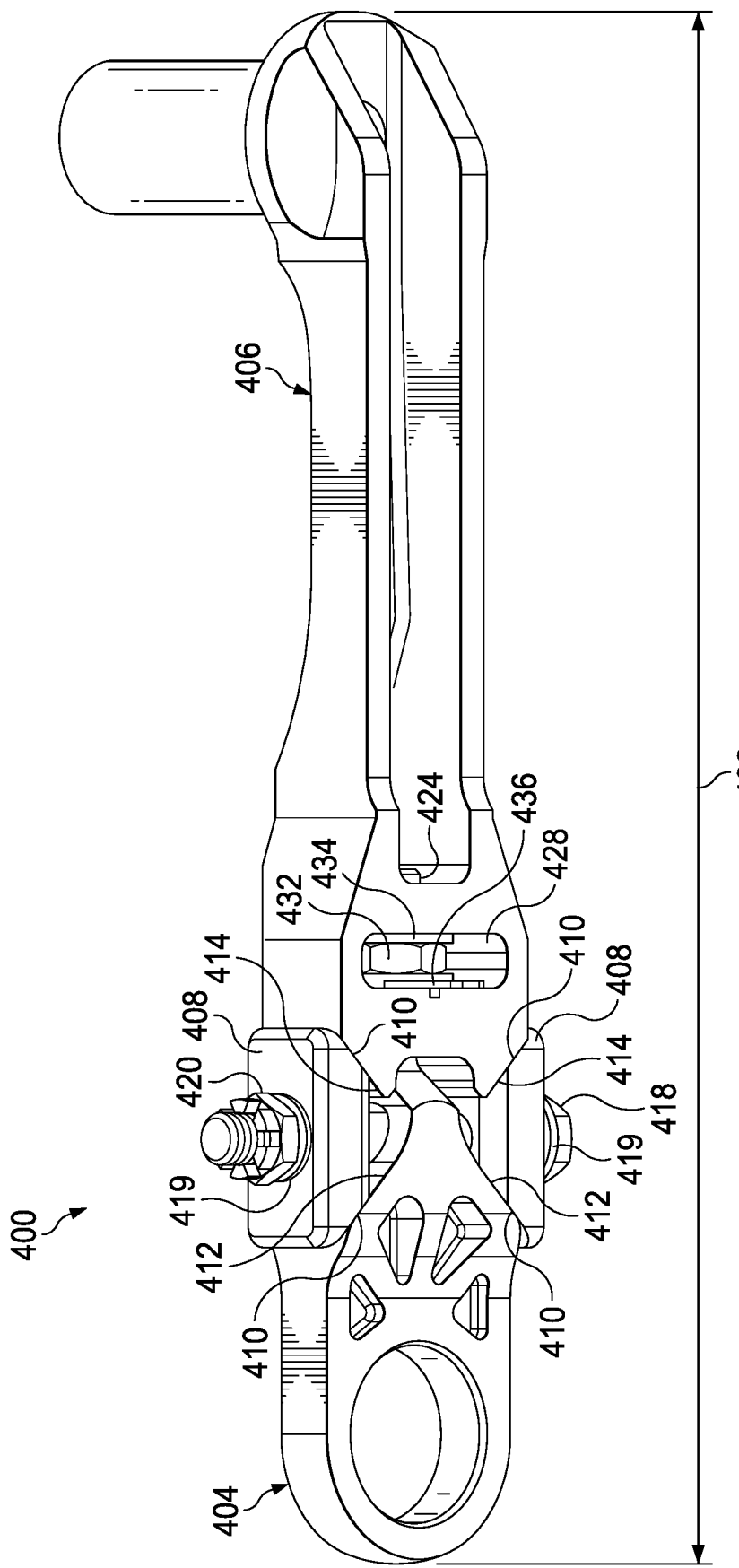
FIG. 10 is an oblique view of another adjustable crank arm according to an embodiment of this disclosure.
Figure 11:
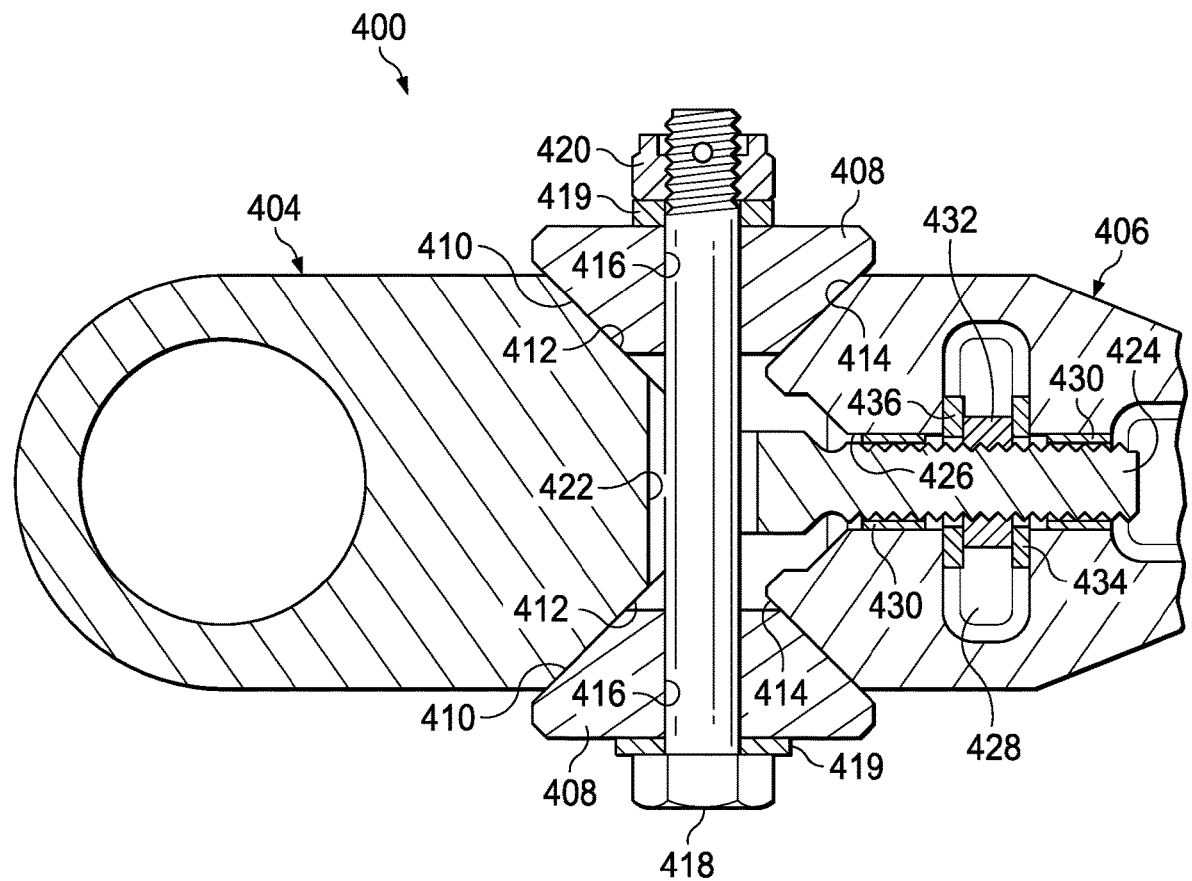
FIG. 11 is a partial cross-sectional view of the adjustable crank arm of FIG. 10.
Figure 12:
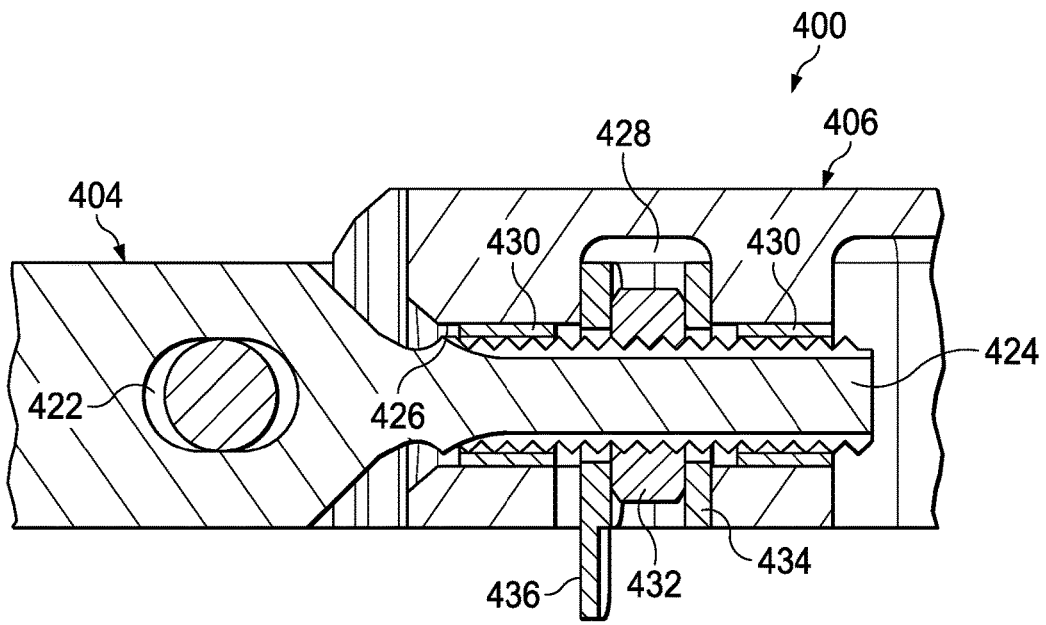
FIG. 12 is another partial cross-sectional view of the adjustable crank arm of FIG. 10.

Referring now to FIG. 10-12, an adjustable crank arm 400 according to another embodiment of this disclosure is shown. Adjustable crank arm 400 can replace adjustable crank arm 300 and/or prior art crank arm 200 in crank arm assembly 130. Adjustable crank arm 400 comprises a rod end 404 and a receiver arm 406. The receiver arm 406 is configured to selectively receive a portion of the rod end 404 while additional components are utilized to secure the rod end 404 relative to the receiver arm 406. Most generally, the adjustable crank arm 400 can be configured to have a variety of different overall lengths 402 by adjusting an amount of longitudinal overlap between the rod end 404 and the receiver arm 406.

Adjustable crank arm 400 further comprises wedges 408 each comprising wedge ramp surfaces 410. Wedge ramp surfaces 410 are configured to complement rod end ramp surfaces 412 of rod end 404 and receiver arm ramp surfaces 414 of receiver arm 406. Wedges 408 further comprise holes 416 configured to receive a threaded bolt 418 (or other fastener) therethrough. Washers 419 can optionally be utilized. Accordingly, in response to a threaded nut 420 being advanced along bolt 418, wedges 408 can be driven toward each other and the resultant interaction between wedge ramp surfaces 410 and each of rod end ramp surfaces 412 and receiver arm ramp surfaces 414 can result in increasing a separation force and/or separation distance between rod end 404 and receiver arm 406.

Referring to FIG. 12, it can be seen that bolt 418 passes through a slot 422 formed in rod end 404 so that some amount of longitudinal adjustment between rod end 404 and receiver arm 406 can be made without applying a bending force to bolt 418 from rod end 404. Adjustable crank arm 400 further comprises a threaded shank 424 extending from rod end 404 for being received by receiver arm 406. Receiver arm 406 comprises an internal passage 426 configured to receive threaded shank 424. Further, a pocket 428 is formed in receiver arm 406 and intersects internal passage 426. In this embodiment, a cylindrical insert 430 is secured within internal passage 426 and is configured to accept threaded shank 424. Further, a jam nut 432 is disposed within pocket 428 and sandwiched between a shim washer 434 and a jam nut lock washer 436. Accordingly, a wrench or other tool can be utilized by inserting the tool into pocket 428 to interface jam nut 432. With sufficient advancement of jam nut 432 along threaded shank 424, longitudinal adjustment and tension can be applied to threaded shank 424, thereby increasing a bending stiffness of the adjustable crank arm 400.

In operation, crank arms 300, 400 can be used by first rotating jam nuts 332, 432 to adjust the length 302, 402 of the assembly, and subsequently adjust the nuts 320, 420 and/or bolts 318, 418 to increase a compression applied by the wedges 308, 408. Alternatively, an overall length can first be achieved by rotating the nuts 320, 420 and/or bolts 318, 418 to adjust the length 302, 402 of the assembly, and subsequently rotating the jam nuts 332, 432 to further secure the assembly. In other embodiments, a threaded wedge can be utilized rather than a separate nut. Still further, in other alternative embodiments, the ramps of wedges can comprise any other suitable shape for providing a sliding engagement surface, such as, but not limited to, a semi-cylindrical profile.

It will be appreciated that the adjustable length crank arms disclosed herein can be utilized for systems other than folding mechanisms and with systems other than aircraft. The systems and methods disclosed here can be utilized in any other system that requires or benefits from the use of an arm or bar with adjustable total length while retaining load bearing and load transfer capabilities in a multitude of directionalities.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_{EL}$, and an upper limit, $R_u$, is disclosed, any number falling within the range is specifically disclosed. In particular, the following numbers within the range are specifically disclosed: $R=R_s+k*$ ($R_u-R_l$), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An adjustable length crank arm, comprising:
   a first component having a longitudinal length;
   a second component coupled to the first component, the second component having a longitudinal length;
   a first wedge comprising a portion captured between the first component and the second component
   wherein a total longitudinal length of the crank arm can be adjusted by changing an amount of longitudinal overlap that exists between the first wedge and at least one of the first component and the second component and wherein the changing the amount of longitudinal overlap comprises moving the first wedge in a direction substantially orthogonal relative to the longitudinal length direction.

2. The crank arm of claim 1, wherein the first component comprises a rod end.

3. The crank arm of claim 1, wherein the first component comprises a threaded shank adjustably received within the second component.

4. The crank arm of claim 3, wherein the second component comprises a pocket and a threaded jam nut disposed within the pocket.

5. The crank arm of claim 4, wherein advancement of the threaded jam nut along the threaded shank at least one of changes the total length of the crank arm and changes a bending stiffness of the crank arm.

6. The crank arm of claim 1, further comprising:
   a second wedge;
   wherein at least a portion of the second wedge is longitudinally captured between the first component and the second component.

7. The crank arm of claim 6, further comprising:
   a threaded bolt disposed through each of the first wedge, the first component, and the second wedge.

8. The crank arm of claim 7, further comprising:
   a nut disposed on the threaded bolt;
   wherein advancement of the nut along the threaded bolt at least one of (1) forces or allows a change in the total length of the crank arm and (2) changes a bending stiffness of the crank arm.

9. The crank arm of claim 1, wherein each of the first component and the second component comprise a ramp surface configured to interface with a first wedge and each of the first component and the second component comprise a ramp surface configured to interface with a second wedge that is opposite the first wedge.

10. The crank arm of claim 9, wherein moving the first wedge closer to the second wedge lengthens the total length of the crank arm.

11. The crank arm of claim 10, wherein the first wedge is substantially the same as the second wedge.

12. An adjustable length crank arm assembly for moving a portion of a rotor blade, comprising:
   an adjustable crank arm;
   an interstitial link coupled to the adjustable crank arm; and
   a portion of a rotor blade coupled to the interstitial link;
   wherein actuation of the adjustable crank arm moves the portion of the rotor blade; and
   wherein the adjustable crank arm has an adjustable total length, wherein the total length is adjustable by changing a distance between opposing wedges of the adjustable crank arm.

13. The crank arm assembly of claim 12, wherein the opposing wedges do not contact each other.

14. The crank arm assembly of claim 12, wherein the opposing wedges do not overlap each other along the direction in which the distance is changed between the opposing wedges.

15. An aircraft, comprising:
   an adjustable length crank arm, comprising:
      a first component having a longitudinal length;
      a second component coupled to the first component, the second component having a longitudinal length;
      wherein a total length of the crank arm is adjusted by moving a wedge of the adjustable length crank arm is a direction substantially orthogonal relative to the longitudinal length direction.

16. The aircraft of claim 15, wherein the first component comprises a threaded shank adjustably received within the second component.

17. The aircraft of claim 15, wherein changing the total length of the crank arm can at least one of (1) be accomplished without drilling additional holes and (2) be accomplished using a wrench.

18. The aircraft of claim 15, wherein the crank arm is a component of a crank arm assembly configured to selectively rotate a portion of a blade of the aircraft.

* * * * *